July 7, 1931.  E. W. DUNBAR  1,813,235
PROCESS OF MANUFACTURING RUBBER ARTICLES
Filed July 31, 1926  2 Sheets-Sheet 1
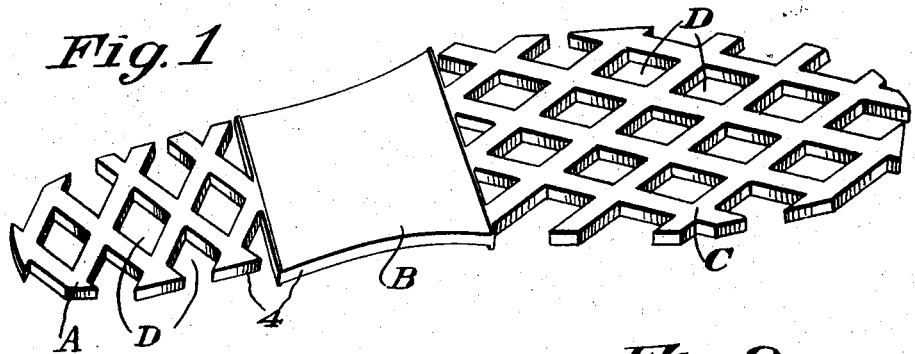
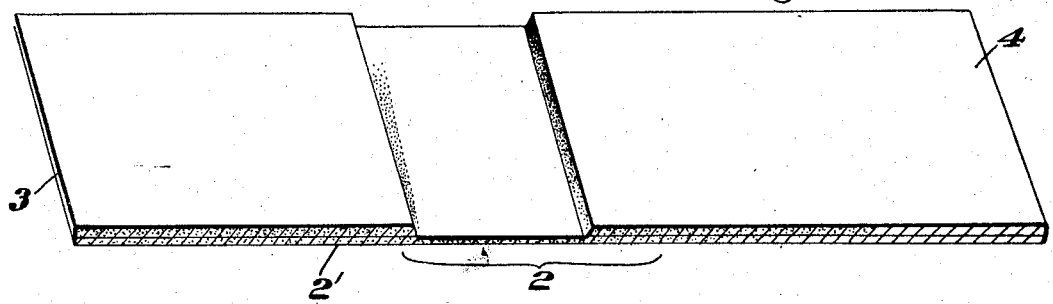
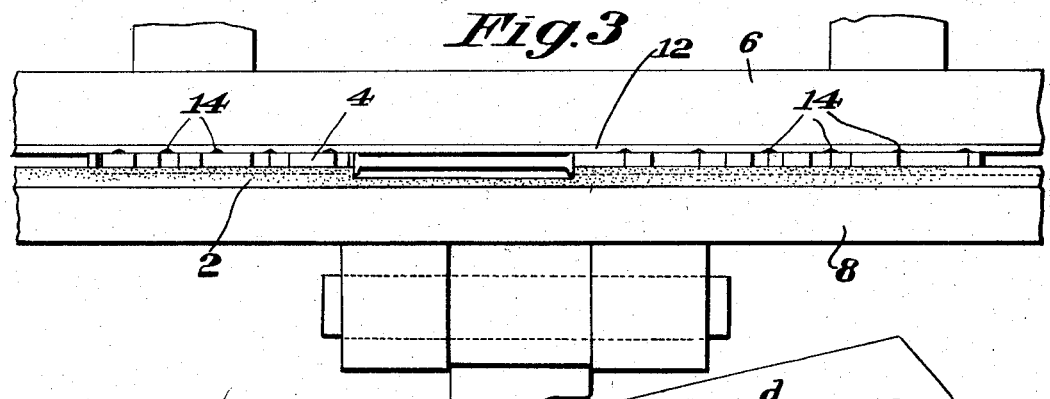
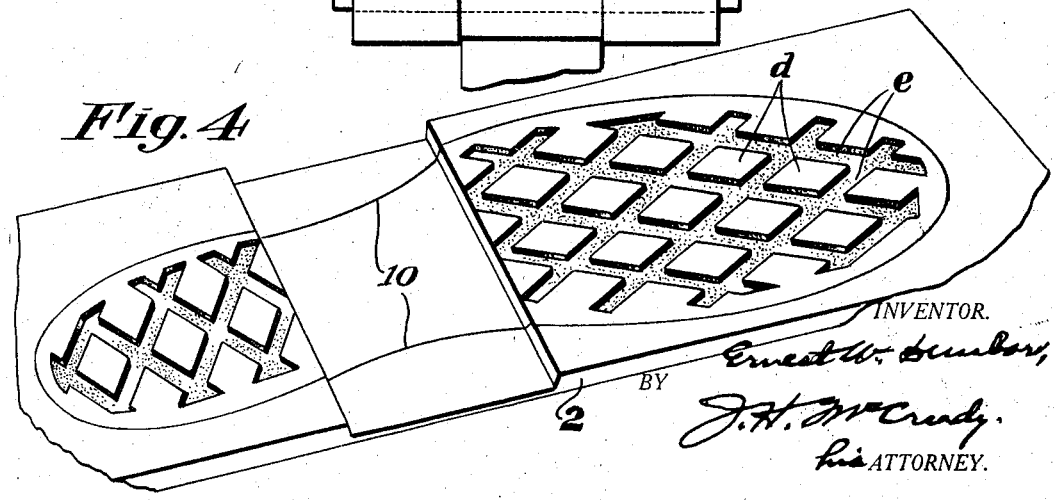
INVENTOR.
Ernest W. Dunbar,
BY J. H. McCrady.
his ATTORNEY.

July 7, 1931.   E. W. DUNBAR   1,813,235
PROCESS OF MANUFACTURING RUBBER ARTICLES
Filed July 31, 1926   2 Sheets-Sheet 2
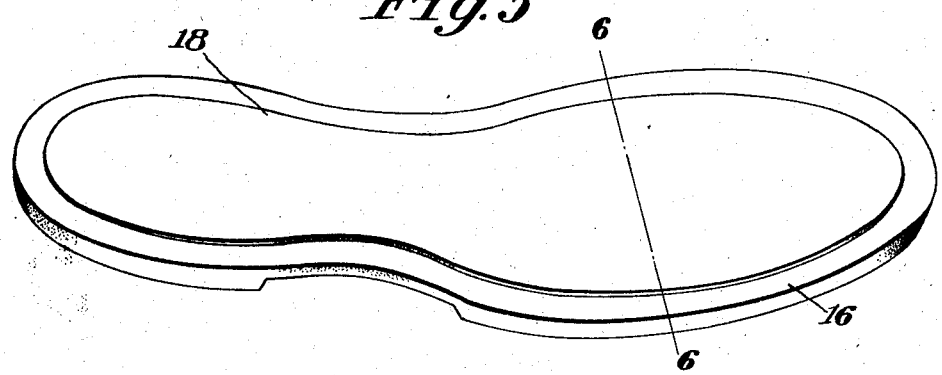
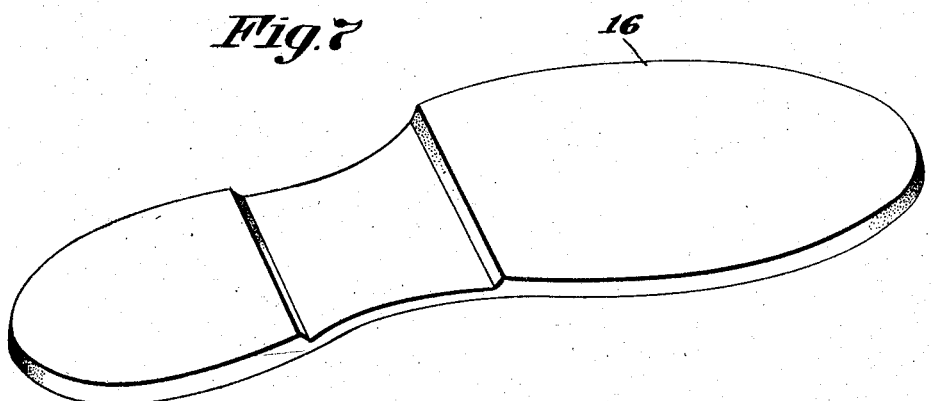
INVENTOR.
Ernest W. Dunbar,
BY
his ATTORNEY.

Patented July 7, 1931

1,813,235

UNITED STATES PATENT OFFICE

ERNEST W. DUNBAR, OF HUDSON, MASSACHUSETTS, ASSIGNOR TO CAMBRIDGE RUBBER CO., OF CAMBRIDGE, MASSACHUSETTS, A CORPORATION OF MASSACHUSETTS

PROCESS OF MANUFACTURING RUBBER ARTICLES

Application filed July 31, 1926. Serial No. 126,139.

This invention relates to the manufacture of molded rubber articles and will be herein disclosed in connection with the manufacture of rubber outsoles for footwear.

It is a very common practice to knurl or roughen the tread surface of an outsole of a rubber shoe of almost any kind for the purpose of preventing slipping. Usually the roughening or knurling is produced in the operation of calendering. In some kinds of footwear, however, as for example, in basketball and sport shoes, the design on the tread face of the sole is much bolder and includes relatively prominent projections or deep grooves or recesses, and such designs cannot be produced satisfactorily in the operation of calendering. It is the usual practice, therefore, to manufacture soles of this type by molding. The usual procedure is to make a rubber compound of suitable composition, sheet this compound, and then to die out or cut out blanks of suitable shape from this sheeted material. These blanks are next placed in molds, the molds are placed in a press, and the stock is subjected to the proper temperature and pressure for a length of time sufficient at least to partially cure or vulcanize the stock. These soles thus are molded at this time to their final shape, and they are cured more or less according to the use which is subsequently to be made of them. If the soles are to be used in rubber footwear which must be vulcanized, they are only partially cured in the molding operation, the cure of vulcanization being completed during the subsequent operation of vulcanizing the shoes. On the other hand, if these soles are to be used on leather shoes they are given their complete cure or vulcanization during the molding operation.

This method of manufacture is very expensive both in time and in equipment. Since the soles are given at least a partial vulcanization the molds should be designed to give them the required curvature to fit smoothly on the bottom of the shoe. This fact, together with the fact that the molds must be made to impart the required design to the tread faces of the sole, makes them very expensive to manufacture. It will be evident, therefore, that the mold equipment necessary for producing the usual range of sizes of a given design is extremely expensive, and this equipment must be changed completely for each new style or design.

The present invention aims to effect economies in the methods of manufacturing rubber outsoles and other molded rubber articles which can be made by substantially the same process. The invention aims especially to devise a process which can be performed more rapidly and with less expensive equipment, while still producing entirely satisfactorily results.

The nature of the invention will be readily understood from the following description when read in connection with the accompanying drawings, and the novel features will be particularly pointed out in the appended claims.

In the drawings,

Figure 1 is a perspective view of a die of a general construction which preferably is used in the practice of this process;

Fig. 2 is a perspective view of a piece of outsole stock prepared for the pressing operation;

Fig. 3 is a side view showing a step in the pressing operation;

Fig. 4 is a perspective view showing the stock or blank after being impressed;

Fig. 5 is a perspective view showing the upper surface of an outsole blank preparatory to pressing;

Fig. 6 is a cross-sectional view on the line 6—6, Fig. 5;

Fig. 7 is a perspective view of the bottom of the blank shown in Fig. 5; and

Fig. 8 is a transverse cross-sectional view of a finished sole.

According to the preferred method provided by this invention, the molding of the rubber composition is performed in a quick acting press. The molded body is then removed from the die or mold, and subsequently it is cured or vulcanized without pressure.

Many, and perhaps most, of the rubber compositions ordinarily used in making outsoles are not suitable for use in this process for the reason that after such a composition has been forced into a die or mold and the pressure immediately released again, the rubber gradually will lose the impression or form given to it by the mold. This is particularly true if the molding operation is performed at substantially normal atmospheric temperatures, as is the preferred practice in carrying out this invention. Consequently, in performing this process it is necessary to use a rubber composition which will retain an impression given to it by such a molding operation as that above described. For this purpose the rubber compound used preferably is of such a type that in its unvulcanized condition it is relatively plastic, although such a compound when vulcanized may be more elastic and have better wearing qualities than other compounds which, in their unvulcanized condition, would not be suitable for use in the present process.

A great variety of compounds can be successfully used in this process, and the nature of the compound used necessarily will vary somewhat with the requirements of individual manufacturers, the rubber market, the use for which the finished article is intended, and the preferences of individual superintendents. A typical composition which has given satisfactory results is as follows: Twenty-five per cent. (25%) of crude rubber, twenty-five per cent. (25%) of reclaimed rubber, twelve percent. (12%) of zinc oxide, twelve per cent. (12%) of lithophone (a mixture consisting essentially of zinc oxide and barium sulphate) four percent. (4%) of a softener, such for example, as tar, oil, or the like, seventeen percent. (17%) of whiting, and five percent. (5%) of vulcanizing ingredients, such as sulphur, accelerator, and the like.

These ingredients are mixed and milled in the usual manner, the milling, however, preferably being continued somewhat longer than usual, and the compound is then sheeted.

In making outsoles, it is preferable to build up a sheet of the general form indicated at 2 in Fig. 2, this sheet comprising a lower ply 2' and plies 3 and 4 united to the opposite margins thereof. The ply 3 is of a length at least equal to the maximum length of the heel portion of the sole to be cut therefrom, while the ply 4 is of a length at least as great as the maximum length of the forepart of the sole. After such a sheet has been prepared the stock is still in a more or less active condition and it is desirable to allow it to age until it comes to rest, twelve hours usually being sufficient for this purpose. It is then cut up into blanks of either a rough form, such as indicated in Fig. 2, or of a sole-shaped outline as shown in Fig. 7.

The process may be most conveniently practiced with the aid of a molding die of a novel construction and shown in Fig. 1, it being understood, however, that this die construction is not essential to the successful practice of this process. It will be observed that the die 4 shown in Fig 1 has the general outline of a whole sole including both a heel part A, shank B, and forepart C. The design has been made by cutting holes D entirely through the die from one face thereof to the other. In the present instance these holes are of diamond shape, but any other design could be substituted for it. The die may be made of brass, steel, or any other suitable metal. This die is next pressed into the surface of the section 2 of unvulcanized rubber stock, preferably while the stock is at substantially normal atmospheric temperatures. For this purpose any suitable press may be used. An ordinary form of press which may conveniently be used for this purpose has a fixed head or plate 6, Fig. 2, and a movable table or presser plate 8 which is moved up and down toward and from the stationary plate 6 by a toggle mechanism, or some other convenient power driven mechanism. The blank 2 is placed on the plate 8 with the die 4 on it, and the plate 8 then carries the die up against the head 6, thus pressing the die 4 firmly into the upper surface of the part 2 of rubber. The press may be so constructed that a slight dwell occurs when the plates 6 and 8 are in their pressure relationship, or the plate 8 may begin to descend instantly upon arriving at the upper limit of its stroke. Either arrangement can be used satisfactorily in this process, but it is preferable from the standpoint of production not to maintain the pressure on the die and stock for more than a few seconds at the most. A moderate degree of pressure only is required to force the die firmly into the rubber composition and make a deep impression in the stock, as clearly shown in Fig. 4.

The die may be immediately removed from the blank. This molding operation makes a bold design in one surface of the blank, as shown in Fig. 4. If the blank so molded is of a rough form, as shown at 4, an outsole of the desired sole-shaped outline can now be cut out of the molded stock, as indicated at 10 in Fig. 4. This cutting operation can either be performed with a cutting die, with a knife, or more preferably, in a sole cutting machine of the type ordinarily used in this industry.

In case the lower surface of the upper pressure plate 6 is very true and flat, some trouble may be experienced with the trapping of the air in the cavities D of the die 4. This difficulty may be obviated by securing to the lower face of the plate 6 another plate 12 having a series of grooves 14 across its lower face. These grooves afford a vent for air trapped in the cavities D. If a thick die is used relatively little trouble is experienced from this trapping of the air since ample space is provided for the compression of the trapped air.

Instead of impressing the design in a very rough blank, such as that shown at 2, I find it usually preferable to prepare an outsole blank from the sheeted stock. Such a blank is shown at 16 in Figs. 5, 6 and 7. This blank is cut out of stock prepared in the same manner as that shown in Fig. 2, the cutting preferably being performed in a sole cutting machine of the type commonly used in this industry. Since the edges of the blank are unconfined during the operation of pressing the die into its surface and therefore may, with certain compositions, be distorted somewhat, I prefer to reinforce the blank with a binder strip 18, Figs. 5 and 6, which is cut to the outline of the sole but is somewhat smaller and is secured on the upper surface of the blank 16, as clearly shown in the drawings. This binder strip consists of a woven fabric heavily frictioned or coated with rubber. The steps in the production of the design in the tread face of this blank are performed exactly as above described, the final result being the same. Fig. 8 shows a finished outsole in transverse cross-section.

It will be noted that the design of outsole shown in Figs. 4 and 8 has relatively large projections $d$ which are separated from each other by deep grooves $e$. The present process is of particular value in making a rubber outsole having deep grooves or prominent projections in its tread face. Bold designs of this character cannot be made satisfactorily in calendering, but, as above stated, have been made heretofore by molding. The present process greatly reduces the expense of manufacture of outsoles of this type because it requires relatively inexpensive molds or dies, no heat is required, it involves the expenditure of only a fraction of the time required for the molding process, and the labor expense is greatly reduced. The presses used are much less expensive and operate much faster. Furthermore, in changing from one style of design to another, the scrapping of expensive equipment is avoided, and the expense for new dies is comparatively small. The process, therefore, lends itself readily to the manufacturing requirements in this industry. A die such as that shown in Fig. 1 is preferable both because the same die can be used for rights and lefts, and also because two or more sizes of soles can be made from the same die.

It should also be noted that since the sole is made from unvulcanized rubber stock the scrap stock left after the trimming operation or the cutting out of the sole blanks can all go back to the mill and re-worked. Waste therefore is eliminated.

The outsoles made by this process may be used in the manufacture of footwear exactly as are molded soles. In the case of rubber shoes, such as basketball shoes and the like, the sole is assembled with the other parts of the shoe and the cure or vulcanization of the sole is effected simultaneously with the vulcanization of the entire shoe. Where the outsoles are to be stitched on the bottom of leather shoes, they are vulcanized before being incorporated in the shoes.

After a sole has been molded in the manner above described, I find that if it is immediately put into the vulcanizing oven it loses a large part of the impression or form which has been given to it by the mold or die. This difficulty, however, is obviated by allowing the soles to rest or age for a time before they go into the vulcanizing oven. Usually it is preferable to allow at least twenty-four hours to elapse between the molding and vulcanizing operations. In order to obtain the best results, therefore, the stock should go through two ageing or resting periods, one between the sheeting and the molding, and the second between the molding and vulcanizing.

Essentially the same process may be used in the manufacture of other articles which have heretofore been made by molding and vulcanizing under pressure. Step mats for the running boards of automobiles may, for example, be made in this way at a substantial saving in the expense of manufacture. In performing the vulcanizing operation it is not necessary to confine the article in a mold since the stock has already been molded to the desired shape. While a more accurate shaping of the article might be produced by performing the vulcanizing operation with the blank in a mold or die, even if no pressure were mechanically applied, still this ordinarily is not done, since the outsole or other article being manufactured loses so little in shape when vulcanized in a free condition, or out of the die or mold, that an entirely satifactory article is produced.

While I have disclosed the preferred method of practicing my invention it will be understood that the process is susceptible of modification within the spirit and scope of the invention. For example, I have referred to the pressing of the die into the rubber stock but it is obvious that the stock could be pressed into the die or mold, the two operations being equivalents. Also, while I have given a typical composition of rubber stock which can be successfully used in this process, it will be understood that an enormous variety of compositions could be employed. The requirements of a stock suitable for this process have been explained above, and with this explanation any person skilled in the compounding or rubber stocks will be able to practice this process successfully.

Having thus described my invention, what I desire to claim as new is:

1. That improvement in the method of making molded rubber articles which consists in providing an unvulcanized rubber compound of suitable composition, relatively pressing a portion of said compound and a die together while they are at substantially normal atmospheric temperatures to mold the compound, utilizing said molding operation to produce a bold design in the article so molded, separating said die and the body molded thereby, subsequently allowing the body so molded to rest for a substantial period of time, and then vulcanizing said molded body in an unconfined condition.

2. That improvement in the method of making molded rubber articles which consists in providing a sheet of unvulcanized rubber compound of suitable composition, relatively pressing a section of said sheet and a die together while at substantially normal atmospheric temperatures to mold said section, maintaining said pressure for a brief interval only, separating said die from the molded body, allowing the body so molded to rest for a substantial period of time, and then vulcanizing said molded body in an unconfined condition.

3. That improvement in the method of making molded rubber outsoles which consists in providing a sheet of unvulcanized rubber compound of suitable composition, pressing a die into a section of said sheet while at a substantially normal atmospheric temperature and thereby molding a bold design into said section, releasing said pressure after a brief interval, separating the die from the molded body, allowing the section so molded to rest for several hours, and then vulcanizing said molded section in an unconfined condition.

4. That improvement in the method of making molded rubber outsoles which consists in providing a sheet of unvulcanized rubber compound of suitable composition, cutting a sole blank from said sheet, pressing a die into said blank and thereby molding the blank, releasing said pressure after a brief interval, separating the die from the molded body, allowing the section so molded to rest for several hours, and subsequently vulcanizing the molded blank in an unconfined condition.

5. That improvement in the method of making rubber footwear having a molded outsole, which consists in providing an unvulcanized rubber sole blank of suitable composition, pressing a die into said blank and thereby molding it, without vulcanizing it, releasing said pressure after a brief interval, subsequently applying the molded blank to the bottom of a shoe, and then, after an interval of several hours following the molding step, vulcanizing the shoe with the sole blank applied thereto.

6. That improvement in the method of making molded elastic rubber articles, which consists in making an unvulcanized rubber sheet of suitable composition, allowing said sheet to rest for several hours after it has been completed, cutting a rubber blank from said sheet, pressing a die into said blank while at substantially normal atmospheric temperature and thereby molding it, releasing said pressure after a brief interval and separating said die from the molded blank, allowing the blank so molded to rest for several hours, and then vulcanizing said molded blank in an unconfined condition.

ERNEST W. DUNBAR.